US012601283B2

(12) United States Patent
    Kassab

(10) Patent No.: US 12,601,283 B2
(45) Date of Patent: Apr. 14, 2026

(54) TURBINE EXHAUST CASE MIXER

(71) Applicant: PRATT & WHITNEY CANADA CORP., Longueuil (CA)

(72) Inventor: Rabih Kassab, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 914 days.

(21) Appl. No.: 16/382,930

(22) Filed: Apr. 12, 2019

(65) Prior Publication Data

US 2020/0318495 A1 Oct. 8, 2020

Related U.S. Application Data

(60) Provisional application No. 62/830,752, filed on Apr. 8, 2019.

(51) Int. Cl.
    F02K 1/48 (2006.01)
    F01D 25/30 (2006.01)
    F02K 1/38 (2006.01)

(52) U.S. Cl.
    CPC .............. F01D 25/30 (2013.01); F02K 1/386 (2013.01); F02K 1/48 (2013.01)

(58) Field of Classification Search
    CPC ... F02K 1/386; F02K 1/48; F02K 1/46; F05D 2250/61; F05D 2240/12; F05D 2240/122; F01D 9/04; F01D 9/041; F01D 9/042
    See application file for complete search history.

(56) References Cited

U.S. PATENT DOCUMENTS

| | | | |
|---|---|---|---|
| 4,117,671 A | 10/1978 | Neal et al. | |
| 4,226,085 A | 10/1980 | Johnson | |
| 4,817,378 A | 4/1989 | Giffin, III et al. | |
| 5,272,869 A * | 12/1993 | Dawson | F01D 25/162 |
| | | | 415/142 |
| 5,595,040 A | 1/1997 | Chen | |
| 6,312,219 B1 | 11/2001 | Wood et al. | |
| 6,554,569 B2 | 4/2003 | Decker et al. | |
| 8,206,095 B2 * | 6/2012 | Parker | F01D 5/147 |
| | | | 415/191 |
| 8,672,623 B2 * | 3/2014 | Harper | F01D 9/042 |
| | | | 415/209.2 |
| 9,441,502 B2 | 9/2016 | Gbadebo et al. | |
| 2013/0115076 A1 | 5/2013 | Bouchard et al. | |
| 2013/0209246 A1 * | 8/2013 | Gbadebo | F01D 5/141 |
| | | | 415/207 |
| 2014/0169956 A1 * | 6/2014 | Lyders | F01D 5/288 |
| | | | 415/208.1 |

(Continued)

OTHER PUBLICATIONS

Shean Thomas, "Stress Concentrations: How to Identify and Reduce Them in Your Designs", Mar. 21, 2017. https://www.fictiv.com/hwg/design/stress-concentrations-how-to-identify-and-reduce-them-in-your-designs.

*Primary Examiner* — Thomas P Burke

(74) *Attorney, Agent, or Firm* — NORTON ROSE FULBRIGHT CANADA LLP

(57) ABSTRACT

A turbine exhaust case (TEC) mixer for an aircraft engine is disclosed. The aircraft engine has an inner shroud, a nacelle, a fan assembly, a compressor assembly and a turbine assembly. The TEC mixer includes struts extending from the mixer and is adapted to connect to the inner shroud at a shroud-strut interface. A plurality of the struts are narrower in a middle portion thereof than at the shroud-strut interface.

19 Claims, 7 Drawing Sheets

(56)  References Cited

U.S. PATENT DOCUMENTS

| | | | | |
|---|---|---|---|---|
| 2014/0230404 | A1 | 8/2014 | Lefebvre et al. | |
| 2014/0260283 | A1* | 9/2014 | Bouchard | F02K 1/48 |
| | | | | 60/770 |
| 2015/0013341 | A1 | 1/2015 | Cunningham et al. | |
| 2015/0075169 | A1* | 3/2015 | Cunningham | F01D 9/041 |
| | | | | 60/770 |
| 2015/0204212 | A1 | 7/2015 | Mountz et al. | |
| 2017/0370283 | A1* | 12/2017 | Dynak | B23K 31/003 |
| 2018/0038261 | A1* | 2/2018 | Boekeloo | B64D 29/00 |
| 2018/0223693 | A1 | 8/2018 | Suciu et al. | |
| 2018/0328230 | A1 | 11/2018 | Ikeguchi et al. | |
| 2019/0120061 | A1* | 4/2019 | Horn | B32B 7/00 |

* cited by examiner

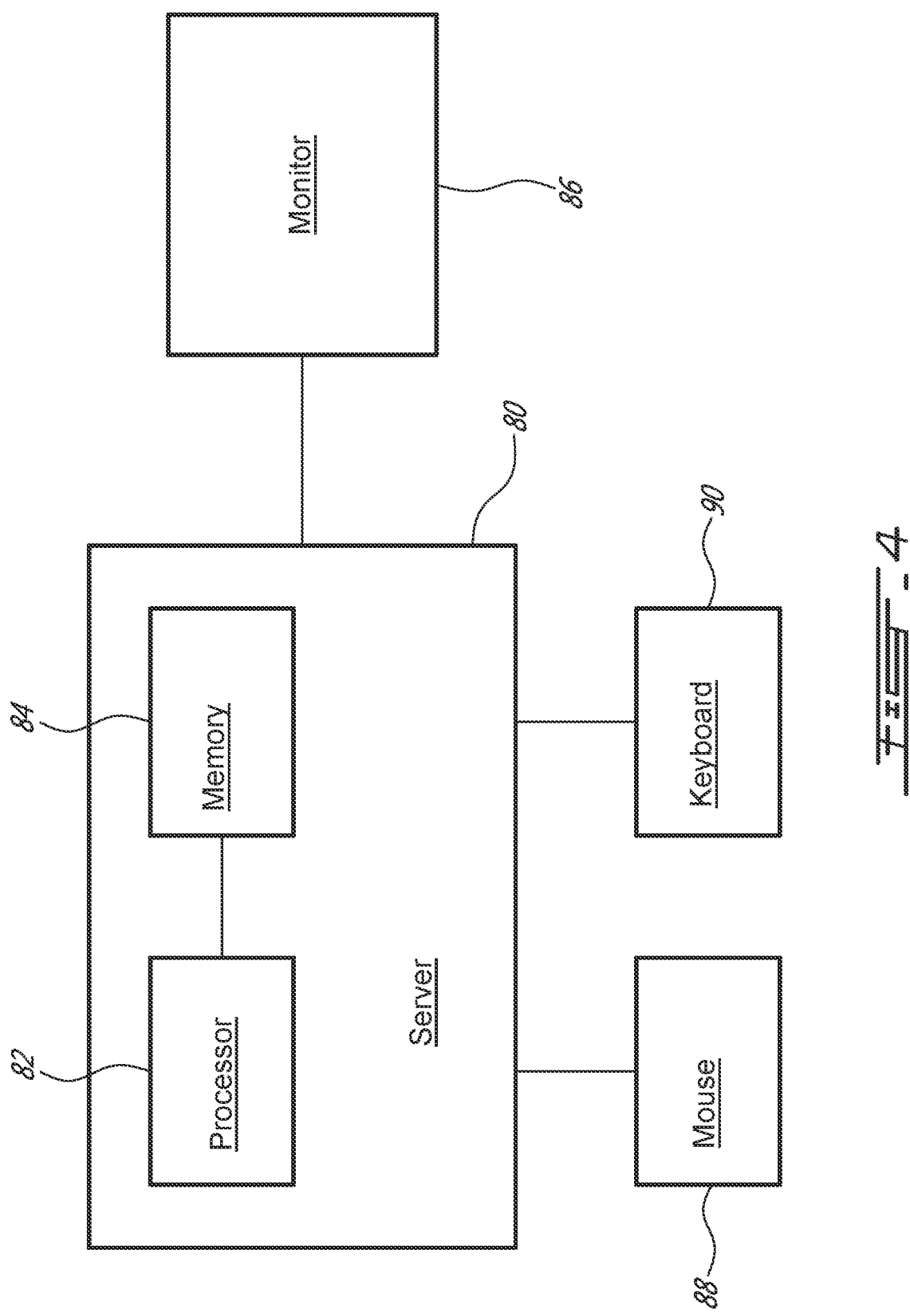
_FIG. 4_

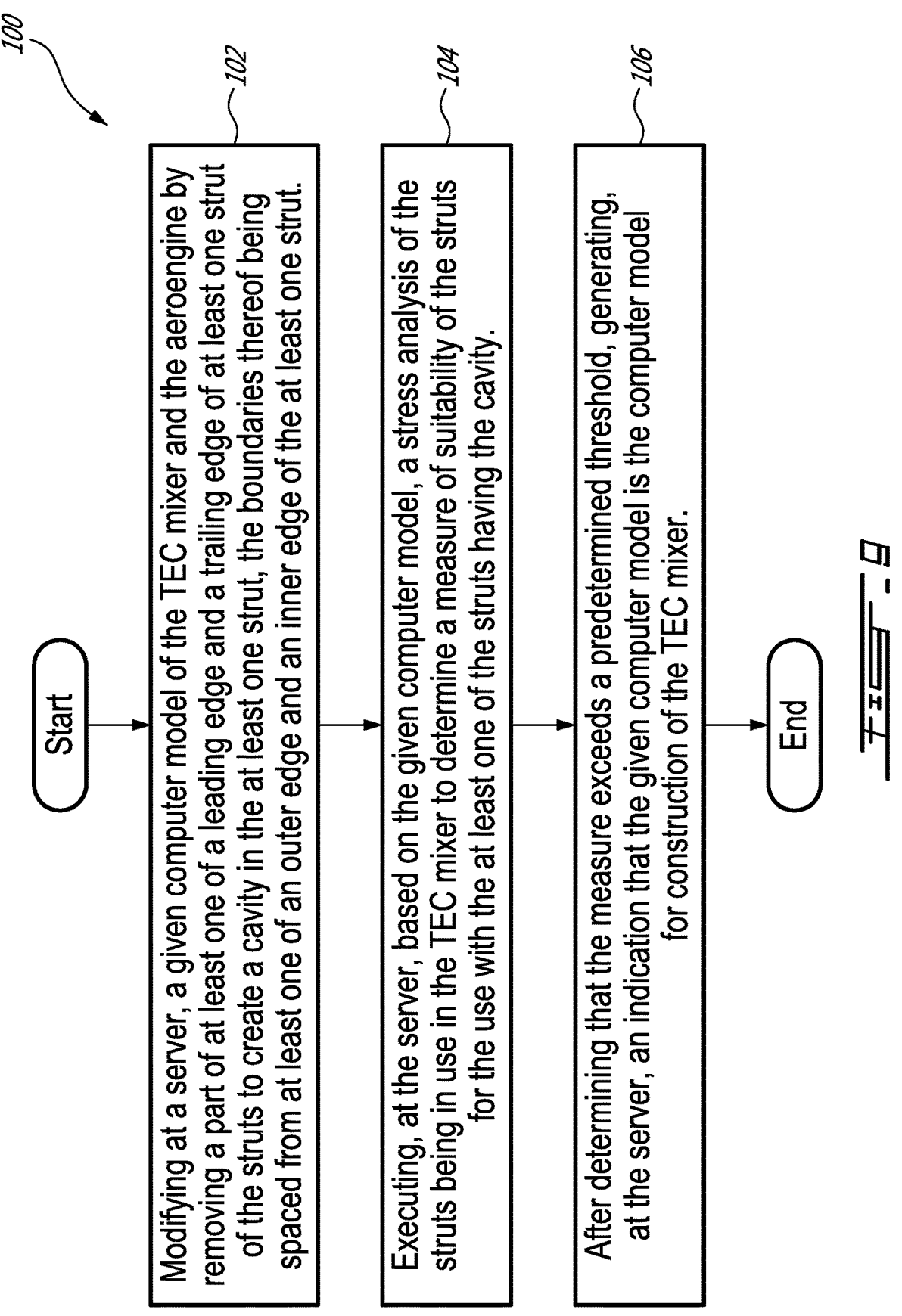

_100_

_102_

Modifying at a server, a given computer model of the TEC mixer and the aeroengine by removing a part of at least one of a leading edge and a trailing edge of at least one strut of the struts to create a cavity in the at least one strut, the boundaries thereof being spaced from at least one of an outer edge and an inner edge of the at least one strut.

_104_

Executing, at the server, based on the given computer model, a stress analysis of the struts being in use in the TEC mixer to determine a measure of suitability of the struts for the use with the at least one of the struts having the cavity.

_106_

After determining that the measure exceeds a predetermined threshold, generating, at the server, an indication that the given computer model is the computer model for construction of the TEC mixer.

Start

End

FIG. 9

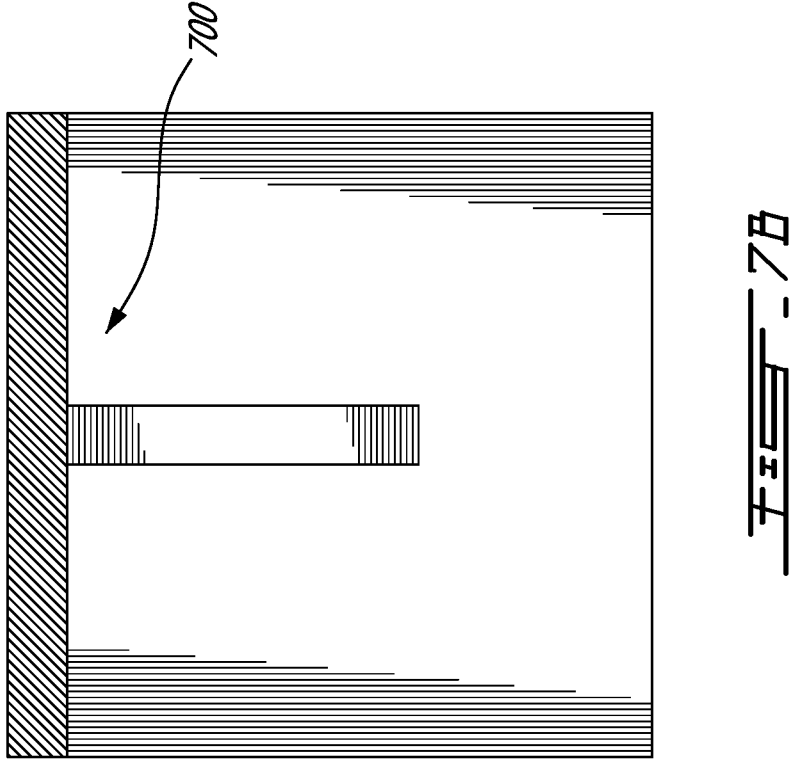
_FIG. 7B_
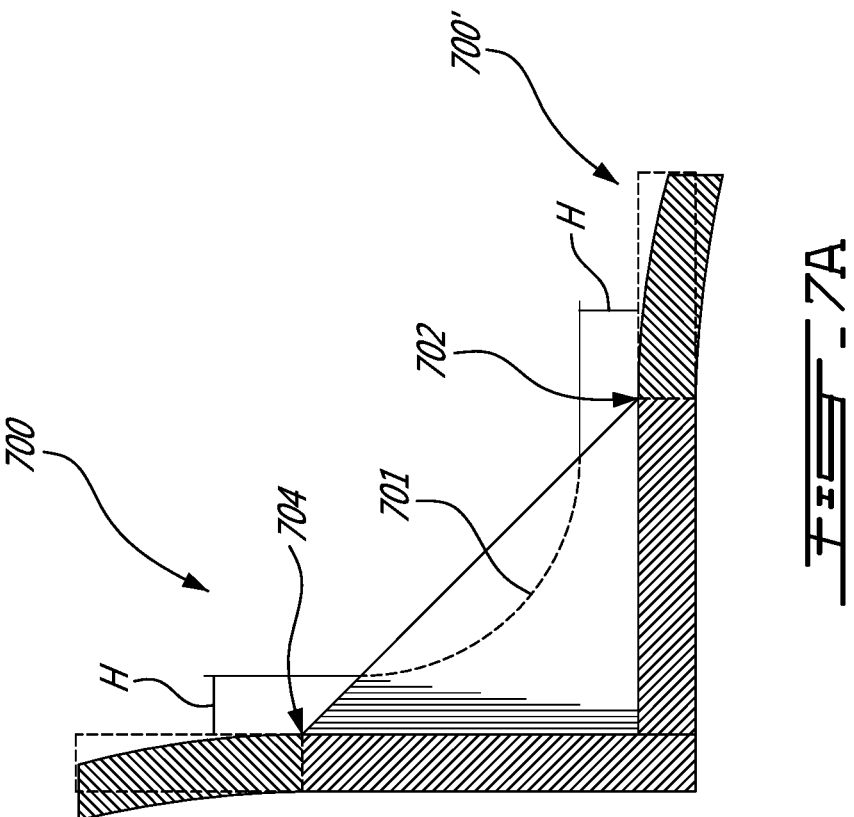
_FIG. 7A_

1

TURBINE EXHAUST CASE MIXER

TECHNICAL FIELD

The application relates to exhaust mixers for turbofan aircraft engines.

BACKGROUND

In order to increase the effective thrust of turbojet engines, bladed fans have been added to a turbine driven shaft thereof to affect the flow of a quantity of atmospheric air through an annular bypass duct surrounding the turbojet. Hot gases exhausted from the engine core and the bypass airstream are mixed together before expulsion through a single nozzle. In order to perform the mixing function, mixers have been attached to the downstream end of a shroud of the turbine exhaust case (TEC).

A TEC mixer may include a plurality of struts that attach the TEC mixer to the aircraft engine such that the exhausted gases are mixed with bypass airflow in order to reduce hotspots in at least part of the exhaust gas airflow. During various altitudes and operating conditions of the aircraft engine, TEC mixers experience various different stresses. In order to enhance a life of TEC mixers, prior art technologies identify "potential weak spots" in various parts of the TEC mixers and add material to the "potential weak spots" to strengthen them. Such prior art methods and the resulting TEC mixers are suitable for their intended purposes. Nevertheless, there is room to improve the prior art.

SUMMARY

In one aspect, there is provided a turbine exhaust case (TEC) mixer for an aircraft engine, the aircraft engine having an inner shroud, a nacelle, a fan assembly, a compressor assembly and a turbine assembly, the TEC mixer comprising struts extending from the mixer and being adapted to connect to the inner shroud at a shroud-strut interface, a plurality of the struts being narrower in a middle portion thereof than at the shroud-strut interface.

In some embodiments, the TEC mixer further comprises an annular wall adapted to be disposed about a central axis of the aircraft engine downstream of the turbine assembly, and wherein the plurality of struts extend from the annular wall.

In some embodiments, each strut of the plurality of struts has a leading surface and a trailing surface, at least one of the leading surface and the trailing surface is defined by a cavity, and boundaries of the cavity are spaced from axial ends of the strut.

In some embodiments, the cavity is a first cavity that defines the leading surface of the strut, the trailing surface is defined by a second cavity, and boundaries of the second cavity are spaced from the axial ends of the strut.

In some embodiments, the cavity is defined in part by a curved portion proximate to the shroud-strut interface of the strut, a tangent to a part of the curved portion defines an angle with a tangent to a part of the shroud-strut interface, and the angle is less than fifteen degrees.

In some embodiments, the strut includes a stepped structure at the shroud-strut interface, the stepped structure including a first step adapted to be connected to the inner shroud of the aircraft engine and a second step disposed closer to a middle portion of the strut than the first step.

In some embodiments, the first step is defined by planar surfaces and fillets.

In some embodiments, the first step includes a planar surface that defines an acute angle with a plane tangent to a part of the shroud-strut interface.

In some embodiments, the planar surface defines an obtuse angle with an adjacent planar surface of the second step.

In some embodiments, the second step includes a planar surface disposed between the first step and the middle portion, and the planar surface defines an angle with the tangent to the part of the shroud-strut interface, the angle being less than fifteen degrees.

In some embodiments, the second step further includes a convex portion disposed between the planar surface and the first step.

In another aspect, there is provided a turbine exhaust case (TEC) mixer for an aircraft engine, the aircraft engine having an inner shroud, a nacelle, a fan assembly, a compressor assembly and a turbine assembly, the TEC mixer comprising struts extending from the mixer and being adapted to connect to the inner shroud at a shroud-strut interface, at least one of the struts including a stepped configuration for reducing at least one stress in the at least one of the struts.

In some embodiments, the stepped configuration includes a first step defining the shroud-strut interface and a second step extending from the first step toward a middle portion of the at least one of the struts, and the first step has a larger footprint than the second step.

In some embodiments, the TEC mixer includes an annular wall adapted to be disposed about a central axis of the aircraft engine downstream of the turbine assembly, and the means includes a first step defining an annular-wall-to-strut interface and a second step extending from the first step defining the annular-wall-to-strut interface toward the middle portion of the at least one of the struts, and the first step defining the annular-wall-to-strut interface has a larger footprint than the second step associated with the annular-wall-to-strut interface.

In yet another aspect, there is provided a turbine exhaust case (TEC) mixer for an aircraft engine configured for mixing concentric core and bypass gas flows via a lobed mixer, the TEC mixer comprising struts extending in a span-wise direction from mixer lobes to an inner shroud across the core gas flow, the strut having leading and trailing edges separated by an axial chord, the struts axially narrower in the chord at a mid-span portion of the strut than at an interface of the strut and the inner shroud.

In some embodiments, the TEC mixer further comprises an annular wall adapted to be disposed about a central axis of the aircraft engine downstream of the turbine assembly, and wherein the struts extend from the annular wall.

In some embodiments, each strut of the struts has a leading surface and a trailing surface, at least one of the leading surface and the trailing surface is defined by a cavity, and boundaries of the cavity are spaced from axial ends of the strut.

In some embodiments, the cavity is a first cavity that defines the leading surface of the strut, the trailing surface is defined by a second cavity, and boundaries of the second cavity are spaced from the axial ends of the strut.

In some embodiments, the cavity is defined in part by a curved portion proximate to the interface, a tangent to a part of the curved portion defines an angle with a tangent to a part of the interface, and the angle is less than fifteen degrees.

In some embodiments, the strut includes a stepped structure at the interface, the stepped structure including a first step adapted to be connected to the inner shroud of the aircraft engine and a second step disposed closer to the mid-span portion of the strut than the first step.

In yet a further aspect, the present technology provides a method of constructing a computer model to be used in constructing a turbine exhaust case (TEC) mixer for an aircraft engine, the TEC mixer including struts for connecting the TEC mixer to the aircraft engine, the method comprising modifying, at a server, a given computer model of the TEC mixer and the aircraft engine by removing a part of at least one of a leading surface and a trailing surface of at least one strut of the struts to create a cavity in the at least one strut, the cavity being spaced from at least one of an annular-wall-to-strut interface and an shroud-strut interface of the at least one strut, executing, at the server, based on the given computer model, a stress analysis of the struts being in use in the TEC mixer to determine a measure of suitability of the struts for the use with the at least one of the struts having the cavity, and after determining that the measure exceeds a predetermined threshold, generating, at the server, an indication that the given computer model is the computer model for construction of the TEC mixer.

In some embodiments of the method, the method includes, prior to the modifying, executing at the server based on the given computer model a stress analysis of the struts being in use in the TEC mixer to determine a stress distribution in each of the struts, and identifying the at least one strut as having a magnitude of at least one type of stress in the stress distribution of the at least one strut that is higher than a magnitude of the at least one type of stress in the stress distribution of at least another one of the struts.

In some embodiments of the method, the stress analysis to determine the stress distribution in each of the struts includes determining at least one of: a membrane stress, a secondary stress, and a peak stress.

In some embodiments of the method, the stress analysis includes determining a stress distribution in the struts, the determining the measure of suitability of the struts includes determining an expected life of the struts based on the stress distribution in the struts with the at least one of the struts having the cavity, and the predetermined threshold is a predetermined minimum life of the struts.

In some embodiments of the method, the method includes, in response to determining that the measure of suitability is below the predetermined threshold, modifying a shape of the cavity, executing a second iteration of the stress analysis to determine a second measure of suitability of the struts for the use, and in response to determining that the second measure exceeds the predetermined threshold, generating, at the server, the indication that the given computer model is the computer model for construction of the TEC mixer.

In some embodiments of the method, the method includes, after determining that the measure exceeds the predetermined threshold, modifying a shape of the cavity to reduce a height of a part of the at least one strut between the cavity and the at least one of the annular-wall-to-strut interface and the shroud-strut interface of the at least one strut, and executing a subsequent iteration of the stress analysis to determine a subsequent measure of suitability of the struts for the use, and after determining that the subsequent measure exceeds the predetermined threshold, generating, at the server, the indication that the given computer model is the computer model for construction of the TEC mixer.

In yet another aspect, there is provided a method of constructing a given TEC mixer for a given aircraft engine, comprising constructing a computer model of the given TEC mixer using the method in any of the embodiments thereof described above, and constructing the given TEC mixer based on the computer model.

Further details of these and other aspects of the described subject matter will be apparent from the detailed description and drawings included below.

DESCRIPTION OF THE DRAWINGS

Reference is now made to the accompanying figures in which:

FIG. 4 is a schematic showing an example of a server that could be used to execute methods of the present technology;

FIG. 5 is a flow diagram showing a method of constructing a computer model to be used in constructing a turbine exhaust case (TEC) mixer for an aircraft engine, according to the present technology;

FIG. 7A is an elevation view of an L-joint being modified according to the present technology; and FIG. 7B is a plan view of the L-joint of FIG. 7A.

It will be noted that throughout the appended drawings, like features are identified by like reference numerals.

DETAILED DESCRIPTION

Figure 1:
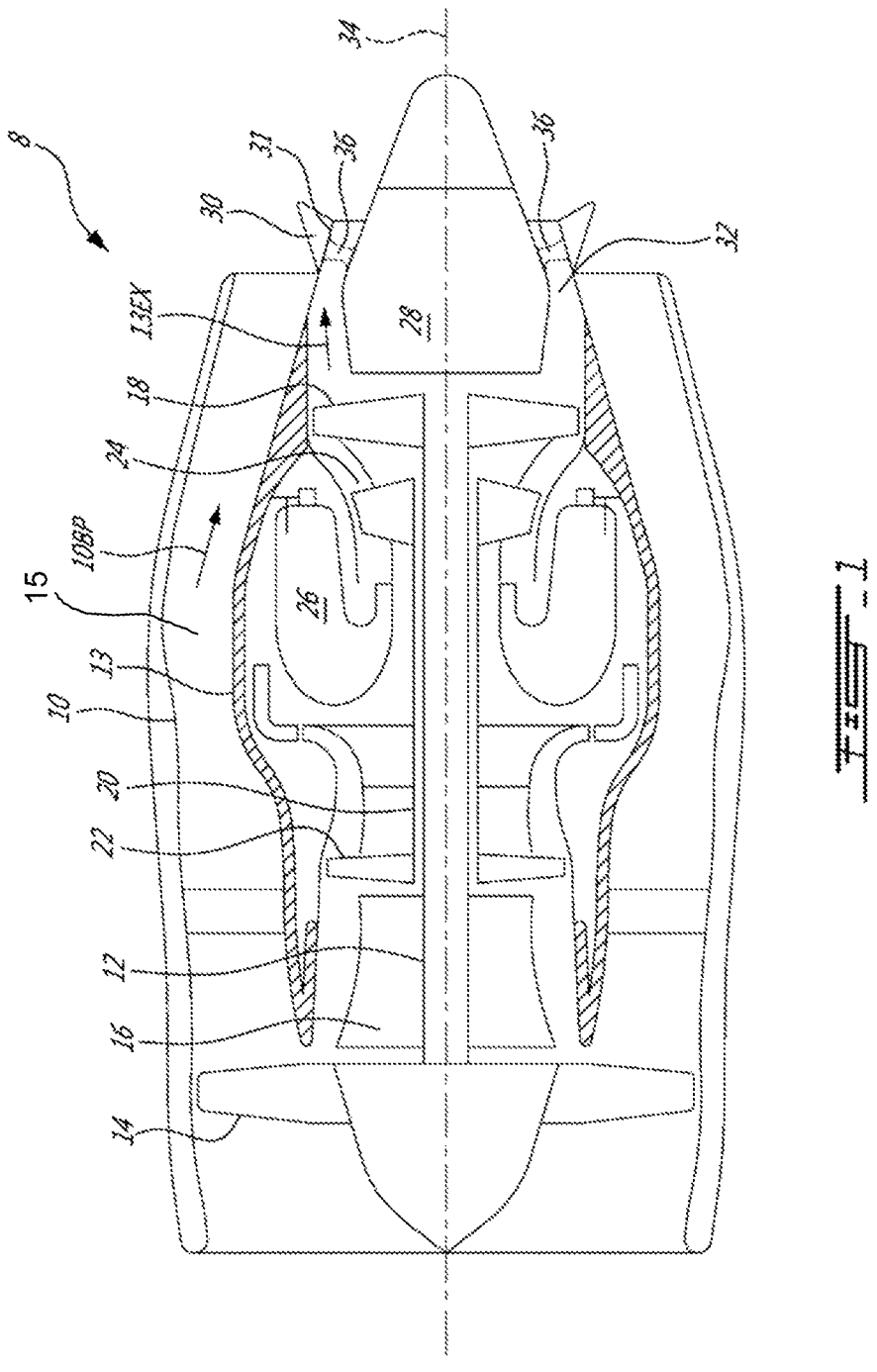
FIG. 1 is a partial cross-sectional view of an aircraft engine, comprising a turbine exhaust case (TEC) mixer.

FIG. 1 illustrates a turbofan aircraft engine 8 which includes a nacelle 10, a core casing 13, a low pressure spool assembly 12 which includes a fan assembly 14, a low pressure compressor assembly 16 coupled to a low pressure turbine assembly 18, and a high pressure spool assembly seen generally at 20 which includes a high pressure compressor assembly 22 coupled to a high pressure turbine assembly 24.

The core casing 13 surrounds the low and high pressure spool assemblies 12, 20 in order to define a main fluid path (not numbered) therethrough. In the main fluid path there is provided a combustion chamber 26 in which a combustion process produces combustion gases that power the high and low turbine pressure assemblies 24, 18. The core casing 13 extends from a front portion of the aircraft engine 8 toward a hub/inner shroud 28 disposed at a rear of the aircraft engine 8 downstream of the high pressure turbine assembly 24.

The aircraft engine 8 further includes a turbine exhaust case (TEC) mixer 30 which is disposed downstream of the high pressure turbine assembly 24. The hub/inner shroud 28 may be circular in shape, for example, and may have an annular body. The TEC mixer 30 surrounds the hub/inner shroud 28 to form an annular exhaust gas duct 32 disposed radially therebetween. Hot exhaust gases 13EX that are discharged from the pressure turbine assemblies 18, 24 exit the main fluid path of the aircraft engine 8 and pass through the exhaust gas duct 32.

Also, a bypass airstream 10BP driven by the fan assembly 14 flows through an annular bypass duct 15 defined radially between the nacelle 10 and the core casing 13. At least part of the bypass airstream 10BP exits the aircraft engine 8 by passing through, or along, the TEC mixer 30. At least part of the bypass airstream 10BP and at least part of the hot exhaust gases 13EX mix at least after exiting the aircraft engine 8.

Referring to FIG. 1, the hub/inner shroud 28 and the TEC mixer 30 may define a central axis 34 that is substantially collinear with a central rotation axis of the aircraft engine 8, or parallel or quasi parallel to the central rotation axis. For the purposes of this document, the terms "upstream" and "downstream" are used to refer to the direction of a fluid flow passing through the main fluid path of an aircraft engine. The terms "axial", "radial" and "circumferential" are used with respect to the central axis 34 of the aircraft engine 8. The terms "forward" and "rearward" are used with respect to the direction of flight.

The TEC mixer 30 according to one embodiment such as the one shown in FIG. 1 includes an annular wall 31 around the central axis 34. The annular wall 31 of the TEC mixer 30 defines the exhaust gas duct 32. In the present embodiment, the annular wall 31 is distinct from the core casing 13, and from the shroud(s) and other elements of the core casing 13. However, it is contemplated that the annular wall 31 could be part of the core casing 13 and/or other element(s) of the aircraft engine 8 for example.

The annular wall 31 is shaped for directing at least part of the bypass airstream 10BP that exits the bypass air duct 15. The shape of the annular wall 31 of the TEC mixer 30 may in at least some embodiments establish a vortex system downstream of the TEC mixer 30 to encourage mixing between the bypass airstream 10BP and the turbine exhaust gases 13EX at least downstream of the TEC mixer 30 during operation of the aircraft engine 8.

As schematically shown in FIG. 1, the TEC mixer 30 includes a plurality of struts 36 that are circumferentially distributed and spaced apart along an inner surface of the annular wall 31. The struts 36 have leading and trailing edges (36L, 36T respectively) and extend in a chord-wise direction along at least a part of an axial length of the annular wall 31, for example between an upstream end and a downstream end of the annular wall 31, or at other points. The struts 36 are distributed circumferentially around the hub/inner shroud 28, in this example, at equal circumferential distances, though the skilled reader will appreciate that the struts 36 spacing could be different. The struts 36 extend generally radially. Any suitable arrangement for struts 36 may be employed, however.

In the present embodiment, the struts 36 extend in a span-wise direction across the annular exhaust gas duct 32 and connect the TEC mixer 30 to the inner shroud, and more particularly in this embodiment to the hub/inner shroud 28. More particularly, in the present embodiment, the struts 36 extend from the annular wall 31 of the TEC mixer 30 to the hub/inner shroud 28.

In at least some embodiments, the struts 36 may be shaped, positioned, oriented and sized so as to at least in part deswirl the exhaust gases 13EX that pass through the exhaust gas duct 32. In some embodiments, one or more of the struts 36 may be structural in nature and need not provide a deswirling action. One or more of the struts 36 may be at least in part disposed outside of the exhaust gas duct 32 and/or may connect to a different part of the aircraft engine 8 than the hub/inner shroud 28.

Figure 2:
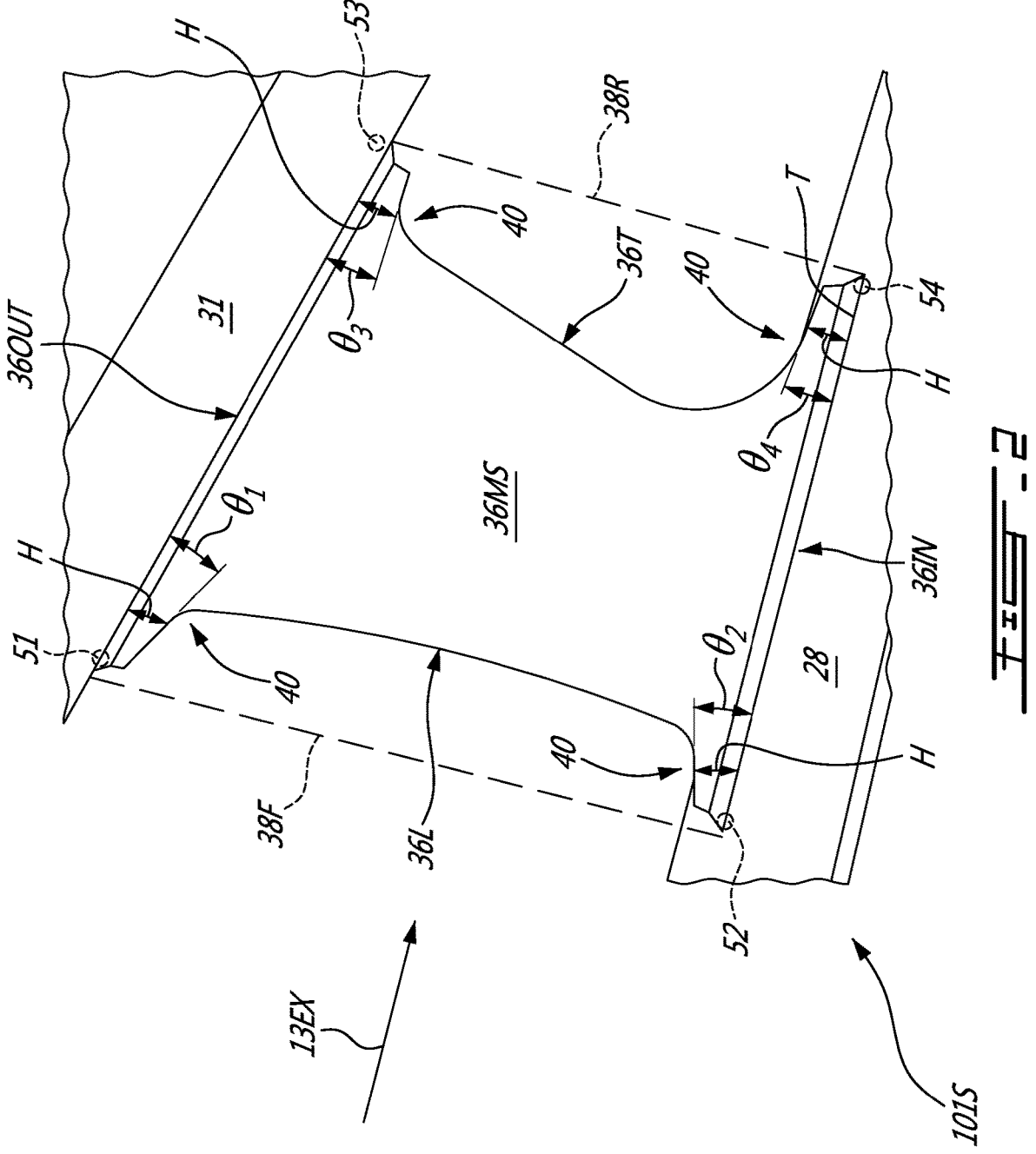
FIG. 2 is a computer model of a strut of the TEC mixer, and parts of the TEC mixer and the aircraft engine, of FIG. 1.

Now referring to FIG. 2, one of the struts 36 of the present embodiment is shown in more detail. In the present embodiment, the rest of the struts 36 are similar to the strut 36 shown in FIG. 2. The rest of the struts 36 are therefore not described in detail. It is contemplated that some of the struts 36 could have a different shape than the rest of the struts 36.

As shown in FIG. 2, the strut 36 includes a leading surface 36L oriented forward, and a trailing surface 36T oriented rearward. The expression "edge surface" is used for 36L and 36T, but they may also be referred to as leading edge 36L and trailing edge 36T, or even leading edge surface 36L and trailing edge surface 36T. The strut 36 may also include an shroud-strut interface 36IN, for connection to the hub/inner shroud 28, and an annular-wall-to-strut interface 36OUT for connection to the annular wall 31. The leading surface 36L may extend between a front portion of the shroud-strut interface 36IN and a front portion of the annular-wall-to-strut interface 36OUT and may face into the stream of exhaust gases 13EX. The trailing surface 36T may extend between a rear portion of the shroud-strut interface 36IN and a rear portion of the annular-wall-to-strut interface 36OUT.

In the present embodiment, the shroud-strut interface 36IN is connected along its length to the hub/inner shroud 28 by being welded to a corresponding portion of the hub/inner shroud 28. It is contemplated that a different connecting arrangement could be used to connect the shroud-strut interface 36IN, directly or indirectly, to the hub/inner shroud 28 or other part of the aircraft engine 8, for example, such as brazing, soldering, casting. The annular-wall-to-strut interface 36OUT is connected along its length to the annular wall 31. It is contemplated that any suitable connecting arrangement could be used to connect the annular-wall-to-strut interface 36OUT to the annular wall 31, such as those mentioned above for the shroud-strut interface 36IN.

As shown in FIG. 2, in the present embodiment, the leading surface 36L of the strut 36 is defined by a cavity (not numbered), and the trailing surface 36T is defined by a cavity (not numbered). In the present embodiment, as shown in FIG. 2, the cavity defining the leading surface 36L of the strut 36 is an inward cavity extending in a rearward direction from a straight radial line 38F extending from a forward tip of the shroud-strut interface 36IN to a forward tip of the annular-wall-to-strut interface 36OUT.

Also as in the present embodiment, as shown in FIG. 2, the cavity defining the trailing surface 36T is an inward cavity extending in a forward direction from a straight radial line 38R extending from a rearward tip of the shroud-strut interface 36IN to a rearward tip of the annular-wall-to-strut interface 36OUT. As shown, boundaries of each of the two cavities are spaced from the shroud-strut interface 36IN and the annular-wall-to-strut interface 36OUT, and hence also from the axial ends of the strut 36. It is contemplated that in some embodiments, at least one of the cavities could extend to one or both of the shroud-strut interface 36IN and the annular-wall-to-strut interface 36OUT.

Still referring to FIG. 2, in the present embodiment, each of the cavities includes a curved portion proximate to the shroud-strut interface 36IN. Each of the cavities also includes a curved portion proximate to the annular-wall-to-strut interface 36OUT. As shown, a tangent to a part of each of the curved portions defines an angle $\theta_1$, $\theta_2$, $\theta_3$, $\theta_4$, respectively, with a tangent to a part of a respective one of the shroud-strut interface 36IN and the annular-wall-to-strut interface 36OUT. The spacing of the boundaries of the cavities from the inner and annular-wall-to-strut interfaces 36IN, 36OUT forms a stepped structure 40 at each corner of the strut 36. It is contemplated that one or more of the struts 36 could have fewer than the four stepped structures 40 and/or could have none of the stepped structures 40.

The angles $\theta_1$, $\theta_2$, $\theta_3$, $\theta_4$ provide a taper that helps increase a flexibility of the struts 36 at least at the extremities of the shroud-strut interface 36IN and the annular-wall-to-strut interface 36OUT. In at least some embodiments and/or applications, the increased flexibility helps reduce peak stresses along at least parts of the shroud-strut interfaces 36IN and the annular-wall-to-strut interfaces 36OUT of the strus 36. In the present embodiment, the angles $\theta_1$, $\theta_2$, $\theta_3$, $\theta_4$ are different, but are all less than fifteen degrees. In some embodiments, the angles $\theta_1$, $\theta_2$, $\theta_3$, $\theta_4$ are different, but are all less than thirty degrees. Further in the present embodiment, the angles $\theta_3$, $\theta_4$ are each less than five degrees. In some embodiments, the angles $\theta_1$, $\theta_2$, $\theta_3$, $\theta_4$ are each less than thirty degrees. In an embodiment, the angles $\theta_1$, $\theta_2$, $\theta_3$, $\theta_4$ range from 0 to 15 degrees. In another embodiment, the angles $\theta_1$, $\theta_2$, $\theta_3$, $\theta_4$ range from 0 to 30 degrees. Such relatively small angles help reduce peak stresses along the respective one(s) of the shroud-strut interface 36IN and the annular-wall-to-strut interface 36OUT. It is contemplated that in some embodiments, one or both of the cavities could include only one of the respective curved portions.

Figure 3:
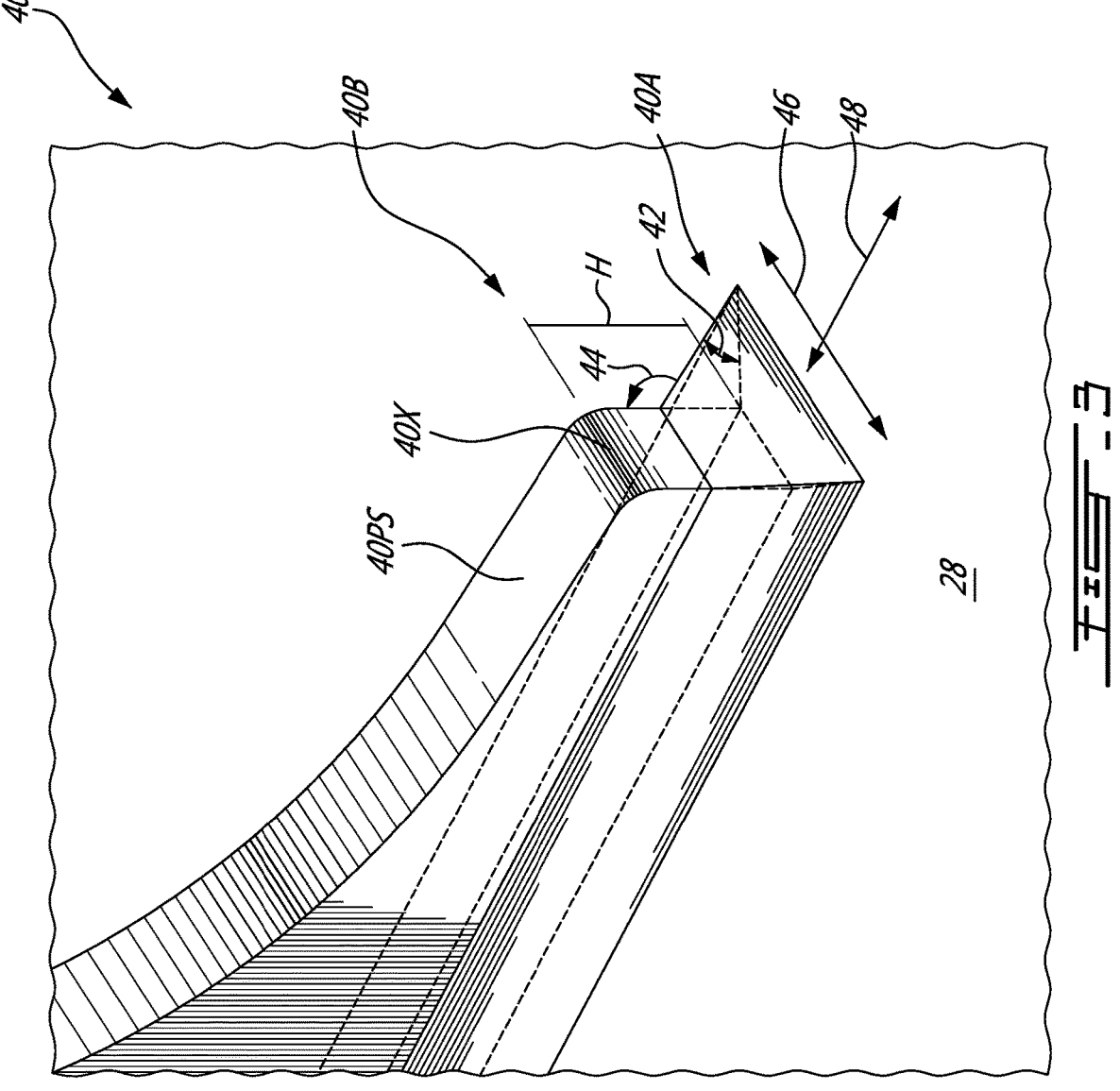
FIG. 3 is a perspective view of a part of the strut of FIG. 3, within the computer model.
Figure 6B:
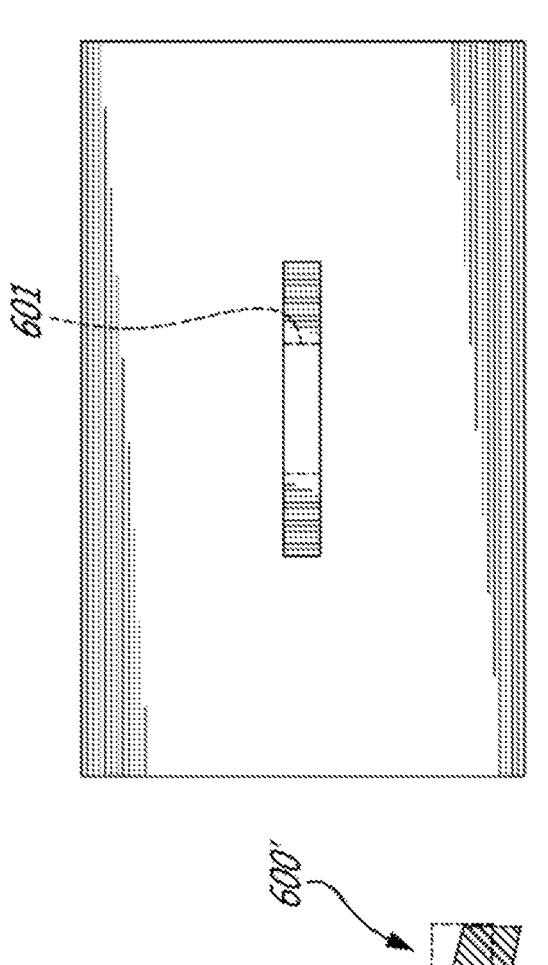
FIG. 6B is a plan view of the T-joint of FIG. 6A.
Figure 6A:
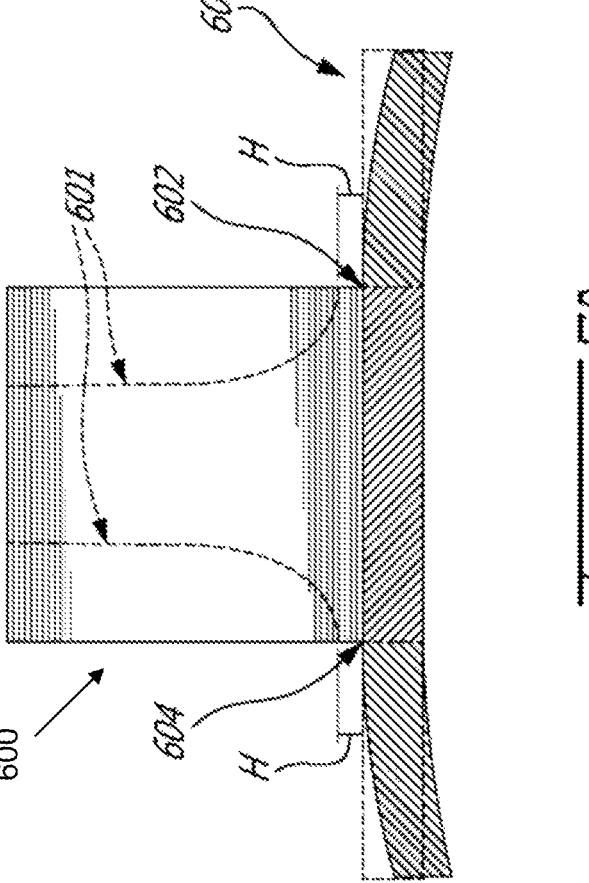
FIG. 6A is an elevation view of a T-joint being modified according to the present technology.

Now referring to FIG. 3, the stepped structure 40 at the rearward tip of the shroud-strut interface 36IN of the strut 36 is shown. In the present embodiment, the stepped structures 40 are similar to each other. As shown, in the present embodiment, a first step 40A of each of the stepped structures 40 is connected to a respective one of the annular wall 31 and the hub/inner shroud 28, and a second step 40B of each of the stepped structures 40 is disposed between the first step 40A and a generally middle portion 36MS (FIG. 2) or mid-span region of the strut 36. In the embodiment shown, the first step 40A is wider than the second step 40B, and may be said to have a larger footprint defining the shroud-strut interface 36IN. In this description, the term "mid-span" is intended to refer to any portion of the span away from the ends of the strut, such as between about 30-70% of the span.

As shown in FIG. 3, the (radially inner) first step 40A is defined by planar surfaces and fillets, with the planar surfaces being angled relative to a plane tangent to a part of an outer surface of the hub/inner shroud 28 to which the first step 40A connects. In the case of the (outer) first steps 40A of the strut 36 that connect to the annular wall 31, each of those first steps 40A is similarly defined by planar surfaces and fillets, with the planar surfaces being angled relative to a plane tangent to a part of a surface of the annular wall 31 to that first step 40A connects.

As shown in FIG. 3, each of the planar surfaces of the (inner) first step 40A defines an acute angle 42 with a plane tangent to a part of the outer surface of the hub/inner shroud 28 to which the first step 40A connects, and an obtuse angle 44 with a contiguous/adjacent planar surface of the corresponding second step 40B. Correspondingly, the (outer) first steps 40A of the strut 36 define an acute angle with the outer surface of the hub/inner shroud 28 to which they connect and an obtuse angle 44 with a contiguous/adjacent surface of each corresponding second step 40B.

In the present embodiment, the second step 40B is disposed radially closer to the middle portion 36MS of the strut 36 than the first step 40A. The second step 40B includes a planar surface 40PS disposed between the curved portion and the first step 40A. In the present embodiment, the planar surface 40PS defines the angle $\theta_2$ (FIG. 2) with a corresponding part of the shroud-strut interface 36IN. Stated differently, a projection of the planar surface 40PS would intersect a projection of shroud-strut interface 36IN and these projections would define the angle $\theta_2$ therebetween. In one aspect, this feature provides a smooth transition between the planar surface 40PS and the contiguous corresponding curved portion of the strut 36.

Still referring to FIG. 3, the second step 40B may further include convex portion 40X disposed between the planar surface 40PS and the first step 40A. In the present embodiment, the convex portion 40X is arcuate, but it is contemplated that other shapes could also be used. The convex portion 40X provides a smooth transition between the first step 40A and the second step 40B. Similarly, the planar surface 40PS provides a smooth transition between the convex portion 40X and the rest of the corresponding cavity in the strut 36. It is contemplated that the surface 40PS could be non-planar.

Such smooth transitions may help reduce a peak stress in the strut 36 in at least at one point when the TEC mixer 30 is in use, and hence may help improve an expected life of the struts 36 in at least some applications of the TEC mixer 30. It is contemplated that one or more of the stepped structures 40 could have a greater or a smaller number of the smooth transitions. It is also contemplated that the particular characteristics of the smooth transitions could be selected to suit each particular embodiment and application of the TEC mixer 30.

In the present embodiment, each of the stepped structures 40 may help reduce peak stresses in the strut 36 along the respective ones of the inner and annular-wall-to-strut interfaces 36IN, 36OUT. With regard to the stepped structure 40 shown in FIG. 3 for example, it has been found that the stepped structures 40 may help reduce peak stresses in the strut 36 at least in a transverse direction 46 out of plane with the strut 36 and in a longitudinal direction 48 along the shroud-strut interface 36IN. Therefore, the stepped structure 40 shown in FIG. 3 is a non-limiting embodiment of a means for reducing at least one stress in at least some of the struts 36. In the present embodiment, the means is a means for reducing at least one stress in at least the strut having the means.

At least some embodiments of the technology described herein above may be said to provide a TEC mixer 30 for an aircraft engine 8 configured for mixing concentric core and bypass gas flows via a lobed mixer (not separately numbered, shown schematically in FIG. 1), the TEC mixer 30 comprising struts 36 extending in a span-wise direction from mixer lobes (not separately numbered, shown schematically in FIG. 1) to an inner shroud 28 across the core gas flow, each strut 36 having leading and trailing edges 36L, 36T separated by an axial chord, the strut 26 being axially narrower in the chord at a mid-span portion of the strut 36 than at an interface of the strut 36 and the inner shroud 28.

With the above embodiments and structures in mind, a method 100 of constructing a computer model to be used in constructing a TEC mixer 30 for an aircraft engine 8 is described next.

Referring to FIG. 4, in some embodiments, the method 100 may be executed at a server 80 that includes a processor 82 and a non-transient memory 84 communicatively coupled to the processor 82, the non-transient memory 84 storing processor-executable instructions which, when executed by the processor 82 cause the server 80 to execute the functionality described in this document.

In some embodiments, the server 80 could be a single physical computer, such as a desktop or a laptop. In other embodiments, the server 80 could be a distributed server and/or a cloud-based server. In the present embodiment, the server 80 is a desktop computer connected to a monitor 86, mouse 88, and keyboard 90. In the present embodiment, the processor 82 includes a central processing unit (CPU) and a graphics processor coupled to the CPU. It is contemplated that any server 80 may be used, so long as the steps of the method 100 can be carried out thereon.

In some embodiments, the method 100 may start by obtaining a given computer model (e.g. see FIG. 2) of a given TEC mixer. In some such cases, the given TEC mixer may have struts one or more of which may have the shape shown with reference lines 38F and 38R in FIG. 2.

The method 100 may include a step of executing at the server 80, based on the given computer model, a stress analysis of the struts of the given TEC mixer being in use in the given TEC mixer to determine a stress distribution in each of the struts. In some cases, the stress analysis may be based on finite element analysis (FEA) according to conventional FEA techniques.

In some embodiments, the stress analysis includes determining at least one of: a membrane stress, a secondary stress, and a peak stress, in each of the struts of the given TEC mixer. An example of a stress distribution 101S is schematically shown in FIG. 2 and indicates peak stresses (shown in dashed lines) in a given one of the struts at locations 51, 52, 53, 54 shown in FIG. 2.

The method 100 may further include a step of identifying magnitudes of at least one type of stress in the stress distribution of each of the struts. In some cases, this step may include determining that a magnitude of the at least one type of stress in at least one of the struts is higher than a magnitude of the at least one type of stress in at least another one of the struts. As such, an imbalance in in-use stress distribution within the struts may be determined, and therefore one or more struts having at least one "over-stressed" point (relative to other points in other ones of the struts) may be identified.

According to the present technology, material is removed from the identified "over-stressed" point(s), thereby making the corresponding part(s) of the strut(s) containing the point(s) relatively more flexible. It has been found that the resulting added flexibility at or proximate to the "over-stressed" point(s) helps absorb and more evenly redistribute one or more stresses from the "over-stressed" point(s) to other location(s) in the structure which may be "under-stressed". In at least some cases, the identified stress distribution imbalance(s) is/are decreased and an expected life of the TEC mixer is lengthened. In at least some cases, the strategic removal of material from, or proximate to, the "over-stressed" point(s) allows to better utilize structural parts of the TEC mixer which had been under-utilized before application of the method 100, and in at least some cases allows to avoid adding material to the TEC mixer and thus helps reduce a weight of the TEC mixer.

To this end, in some embodiments, the method 100 may include step 102, which may include modifying, at the server 80, one or more of the identified struts in the given computer model of the TEC mixer by removing a part of at least one of a leading surface and a trailing surface the strut(s) determined to be "relatively over stressed" according to the results of the stress analysis described above. In some embodiments, this removal of material includes creating one or more cavities in the leading and/or trailing surfaces of the "relatively over stressed" strut(s). In some embodiments, the boundaries of the cavity(ies) are defined so as to be spaced from at least one of an annular-wall-to-strut interface and an shroud-strut interface of the strut(s). It has been found that, in at least some cases, such spacing of the cavity boundaries helps improve stress redistribution.

As an example, as shown in FIG. 3, a part of each of the leading surface and a trailing surface of each identified "relatively over stressed" strut of the TEC mixer may be removed in the given computer model proximate or at to the identified "relatively over-stressed" location(s) 51-54. In some embodiments, the resulting cavities may be iteratively re-shaped as described below, to achieve a desired in-use stress distribution throughout the struts of the TEC mixer. That is, for example the method 100 may include step 104, which may include executing, at the server 80, based on the given computer model modified as described above, another stress analysis of the modified struts being in use to determine a measure of suitability of the struts for the use.

The measure of suitability may be any suitable measure of suitability according to known engineering and stress analysis methods suitable for each particular embodiment of the TEC mixer. In some embodiments, the subsequent stress analysis may be similar to the earlier stress analysis described above. In some embodiments, the measure of suitability may be an expected life of the modified TEC mixer based on the new shape(s) of the modified strut(s). That is, the analysis may include determining an expected life of the TEC mixer based on a subsequently determined resulting stress distribution in the struts of the TEC mixer.

The method 100 may then proceed to a step of determining whether the measure of suitability determined at step 104 exceeds a predetermined threshold. In some embodiments, the predetermined threshold may be for example a predetermined minimum required expected life of the modified strut(s) and/or the modified TEC mixer. It is contemplated that other metrics could likewise be used. In cases where it is determined that the measure of suitability does exceed the desired/predetermined threshold, the method 100 may proceed to a step 106 of generating, at the server 80, an indication that the modified computer model is the computer model to be used for constructing the TEC mixer.

On the other hand, in cases where it is determined that the measure of suitability from step 104 is below the predetermined threshold, the method 100 may proceed to one or more steps of iteratively modifying the shape(s) of the cavity(ies) and/or adding or removing cavity(ies) according to the principles described above in one or more of the strut(s), and thereafter executing corresponding subsequent iteration(s) of stress/suitability analyses as described above to determine when the chosen measure(s) of suitability of the struts finally exceed(s) the desired/predetermined threshold. Once desired/predetermined threshold is met, the method 100 may proceed to the step 106 of generating, at the server 80, the indication that the subsequently modified computer model is the computer model that is to be used to construct the TEC mixer 30.

Also, in some embodiments, even after it is determined that the measure(s) of suitability exceed(s) the desired/predetermined threshold(s), the method 100 may include further iterative cavity modification, addition, or removal steps similar to those described above to further improve stress distribution in the gien TEC mixer, before generating an indication that the given computer model is to be used to construct the TEC mixer.

For example, in some cases, the method 100 may include, after determining that the measure(s) exceed(s) the desired/predetermined threshold, modifying a shape of one or more cavities to reduce a height (H) (FIGS. 2 and 3) of a part of the corresponding strut(s) between the cavity(ies) and the at least one of the shroud-strut interface and the annular-wall-to-strut interface of the corresponding strut(s), and executing subsequent iteration(s) of stress/suitability analyses to re-check whether the resulting measure(s) of suitability of the strut(s) have been further improved, before generating an indication that the given computer model is to be used to construct the TEC mixer.

Once a given version of the given computer model is "finalized", one or more TEC mixers may be constructed based thereon using any suitable known manufacturing method. It is contemplated that in each given TEC mixer, the particular sizes, orientations and positions of the struts thereof may be selected using known engineering principles to suit each particular embodiment and application of the given TEC mixer.

Reference is now made to FIGS. 6A, 6B, 7A, and 7B, which show examples of a T-joint 600 and an L-joint 700 of the type used in constructing larger structures. As shown with dashed cut-out lines, the T-joint 600 and the L-joint 700 are being modified according to the present technology. More particularly, once modified or constructed, the T-joint 600 includes a cavities 601 made therein according to the principles discussed above. Similarly, once modified or constructed, the L-joint 700 includes a single cavity 701 made therein according to the principles discussed above.

These modifications have been found at least in some applications of the joints 600, 700 to reduce in-use (see, for example the in-use deflections 600' and 700' shown in dashed lines) peak stresses in the joints 600, 700, such as at locations 602, 604, 702, 704 for example. In at least some applications, the cavities 601, 701 have been found to improve an expected life of the T-joint 600 and the L-joint 700, respectively. It is contemplated that the present technology could also be used with respect to other types of structural joints.

The above description is meant to be exemplary only, and one skilled in the art will recognize that changes may be made to the embodiments described without departing from the scope of the described subject matter. Modifications which fall within the scope of the described subject matter will be apparent to those skilled in the art, in light of a review of this disclosure, and such modifications are intended to fall within the appended claims.

The invention claimed is:

1. A turbine exhaust case (TEC) mixer for an aircraft engine, the aircraft engine having an inner shroud, a nacelle, a fan assembly, a compressor assembly and a turbine assembly, the TEC mixer comprising struts extending from the TEC mixer and being adapted to connect to the inner shroud at a shroud-strut interface, a plurality of the struts being narrower in a middle portion thereof than at the shroud-strut interface, a strut of the struts including a stepped structure at the shroud-strut interface, the stepped structure including a first step adapted to be connected to the inner shroud of the aircraft engine, the first step extending about a perimeter of the strut at the shroud-strut interface and being defined by multiple planar surfaces, each planar surface of the multiple planar surfaces extending radially outwardly from the shroud-strut interface, each planar surface of the multiple planar surfaces joined along a joining edge thereof to another planar surface of the multiple planar surfaces, the joining edges extending radially outwardly from the shroud-strut interface.

2. The TEC mixer of claim 1, further comprising an annular wall adapted to be disposed about a central axis of the aircraft engine downstream of the turbine assembly, and wherein the plurality of struts extend from the annular wall.

3. The TEC mixer of claim 1, wherein the strut has a leading surface and a trailing surface, at least one of the leading surface and the trailing surface is defined by a cavity, and boundaries of the cavity are spaced from axial ends of the strut.

4. The TEC mixer of claim 3, wherein the cavity is a first cavity that defines the leading surface of the strut, the trailing surface is defined by a second cavity, and boundaries of the second cavity are spaced from the axial ends of the strut.

5. The TEC mixer of claim 3, wherein the cavity is defined in part by a curved portion proximate to the shroud-strut interface of the strut, a tangent to a part of the curved portion defines an angle with a tangent to a part of the shroud-strut interface, and the angle is less than thirty degrees.

6. The TEC mixer of claim 1, comprising a second step disposed between the first step and the middle portion of the strut, the second step extending from the first step toward the middle portion, the first step having a footprint defined relative to the shroud-strut interface that is larger than a footprint of the second step defined relative to the shroud-strut interface.

7. The TEC mixer of claim 1, wherein the multiple planar surfaces include axial planar surfaces being circumferentially spaced apart relative to a center axis of the TEC mixer and having an orientation parallel to a line extending between axial ends of the strut, and transverse planar surfaces extending between the axial planar surfaces and having an orientation transverse to the line extending between axial ends of the strut.

8. The TEC mixer of claim 1, wherein one or more of the planar surfaces of the multiple planar surfaces of the first step defines an acute angle with a plane tangent to a part of the shroud-strut interface, the one of more of the planar surfaces defining an acute angle relative to a line extending between axial ends of the strut.

9. The TEC mixer of claim 8, comprising a second step disposed between the first step and the middle portion of the strut, the second step extending from the first step toward the middle portion, the one or more planar surfaces define an obtuse angle with an adjacent planar surface of the second step, the adjacent planar surface extending radially from the one or more planar surfaces of the first step.

10. The TEC mixer of claim 1, comprising a second step disposed between the first step and the middle portion of the strut, the second step extending from the first step toward the middle portion, the second step including a second step planar surface extending between the first step and the middle portion of the strut, and the second step planar surface defines an angle with a plane tangent to part of the shroud-strut interface, the angle being less than thirty degrees.

11. The TEC mixer of claim 10, wherein the second step further includes a convex portion extending between the second step planar surface and the first step.

12. A turbine exhaust case (TEC) mixer for an aircraft engine, the aircraft engine having an inner shroud, a nacelle, a fan assembly, a compressor assembly and a turbine assembly, the TEC mixer comprising struts extending from the TEC mixer and being adapted to connect to the inner shroud at a shroud-strut interface, at least one of the struts including a stepped configuration for reducing at least one stress in the at least one of the struts, the stepped structure including a first step adapted to be connected to the inner shroud, the first step defined by multiple planar surfaces, each planar surface of the multiple planar surfaces extending radially outwardly from the shroud-strut interface, each planar surface of the multiple planar surfaces joined along a joining edge thereof to another planar surface of the multiple planar surfaces, the joining edges extending radially outwardly from the shroud-strut interface.

13. The TEC mixer of claim 12, wherein the stepped structure comprising a second step disposed between the first step and a middle portion of the at least one strut, the second step extending from the first step toward the middle portion, the first step being wider than the second step relative to the shroud-strut interface.

14. The TEC mixer of claim 12, wherein the TEC mixer includes an annular wall adapted to be disposed about a central axis of the aircraft engine downstream of the turbine assembly, and means including the first step having a first wall step defining an annular-wall-to-strut interface and a second wall step extending from the first wall step defining the annular-wall-to-strut interface toward a middle portion of the at least one of the struts, and the first wall step has a larger footprint relative to the annular-wall-to-strut interface than the second wall step.

15. A turbine exhaust case (TEC) mixer for an aircraft engine configured for mixing concentric core and bypass gas flows via a lobed mixer, the TEC mixer comprising struts extending in a span-wise direction from mixer lobes to an inner shroud across the core gas flow, the struts having a leading edge and a trailing edge separated by an axial chord, the struts axially narrower in the axial chord at a mid-span portion of the strut than at an interface of the strut and the inner shroud, the struts including a stepped structure at the interface, the stepped structure including a first step adapted to be connected to the inner shroud, the first step defined by multiple planar surfaces, each planar surface of the multiple planar surfaces configured to extend radially outwardly from the interface, each planar surface of the multiple planar surfaces joined along a joining edge thereof to another planar surface of the multiple planar surfaces, the joining edges configured to extend radially outwardly from the interface.

16. The TEC mixer of claim 15, further comprising an annular wall adapted to be disposed about a central axis of the aircraft engine downstream of a turbine assembly, and wherein the struts extend from the annular wall.

17. The TEC mixer of claim 15, wherein the struts have a leading surface and a trailing surface, at least one of the leading surface and the trailing surface is defined by a cavity, and boundaries of the cavity are spaced from axial ends of the strut.

18. The TEC mixer of claim 17, wherein the cavity is defined in part by a curved portion proximate to the interface, a tangent to a part of the curved portion defines an angle with a tangent to a part of the interface, and the angle is less than thirty degrees.

19. The TEC mixer of claim 15, wherein the stepped structure is disposed at an intersection between the leading edge and the interface and/or at an intersection between the trailing edge and the interface.

* * * * *